Figure 1:
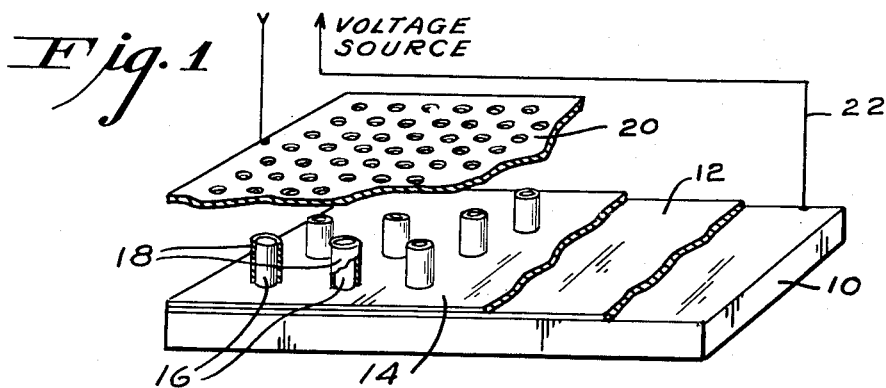

Oct. 10, 1961 T. K. RIGGEN 3,003,904
ELECTROLUMINESCENT DEVICE MAKING
Original Filed Oct. 23, 1959

INVENTOR.
THEODORE K. RIGGEN
BY
Clarence R. Patty Jr.
ATTORNEY.

ELECTROLUMINESCENT DEVICE MAKING
Theodore K. Riggen, Elmira, N.Y., assignor to Corning Glass Works, Corning, N.Y., a corporation of New York
Original application Oct. 23, 1959, Ser. No. 850,011, now Patent No. 2,970,239, dated Jan. 31, 1961. Divided and this application June 23, 1960, Ser. No. 42,739
7 Claims. (Cl. 156—3)

This invention relates to electroluminescent devices, and particularly to radiation sensitive, electroluminescent devices capable of functioning as a photomemory device to reproduce and retain incident images.

This application is a division of my copending continuation-in-part application Serial No. 850,011, filed October 23, 1959, now Patent No. 2,970,239.

The phenomenon of electroluminescense is well known, and a variety of phosphors, or suspensions thereof, capable of luminescing under the influence of an electric field have been proposed. An important application of the phenomenon of electroluminescense is in lighting panels constructed by suspending a suitable phosphor in a dielectric medium between electrodes to which an electric current is applied to produce a voltage drop or electric field.

It is also well known that the electrical resistance of certain semi-conductors is substantially decreased while such semi-conductors are subject to incident radiation. Among such radiation sensitive material are the photoconductors employed in Photronic cells, such materials becoming conducting under the influence of incident light.

It has further been proposed to construct an image-reproducing device based on the combined effect of these phenomena. A simple device of this sort may consist essentially of contiguous layers of an electroluminescent material and a photo-conductive material sandwiched between electrodes across which a difference in potential is established to render the device operative. The applied potential is sufficient to cause luminescence in the electroluminescent material except for the resistance of the photoconductive layer. Incident of light on the photoconductive layer, or portions thereof, sufficiently reduces its resistance to permit luminescence in the electroluminescent layer. By selectively illuminating the photoconductive material, that is imposing a light image on it, corresponding selected areas of the electroluminescent layer are caused to luminesce thus producing a luminescent image in the latter.

A portion of the light thus generated in the electroluminescent layer may be emitted in the direction of the photoconductive material and its incidence thereon is adequate to maintain the photoconductive material in an activated or low resistance state after the original incident radiation is discontinued. Thus the possibility is presented of retaining or "remembering" an image as long as the electrical field or potential is maintained.

However, image definition is quickly lost since the feed-back light spreads to and activates the photoconductive material indiscriminately. It is obvious then that some means of isolating or controlling the feedback light is needed. Means of achieving this have been suggested, but have either proved ineffective or impractical. One of the more promising proposals involved applying a thin glass panel with small closely spaced perforations or holes over the electroluminescent layer and coating or filling of the holes with photoconductive phosphor. Quite surprisingly this appeared to operate in reverse giving a panel of light with dark spots scattered through it.

In the course of investigating this anomaly, it was found that electroluminescence actually occurs under the holes in the glass panel as intended, but that it is also unexpectedly generated under the glass to such a greater extent as to overshadow the intended dots and make them appear dark. This can be ascribed to the glass of the perforated panel providing a greater capacitive effect than the perforations, due in part at least to the glass having a higher dielectric constant than air present in the perforations.

It is a purpose of my invention to provide an electroluminescent device so constructed as to utilize dielectric bodies which permit taking advantage of the greater capacitive effect capable of being provided by a dielectric material such as glass while eliminating the disadvantages found in prior devices. A further purpose is to provide a construction which overcomes prior light-control difficulties. A more specific purpose is to provide a novel, radiation-sensitive, electroluminescent device. A further purpose is to provide such a device which is capable of reproducing and retaining an incident image, and thereby functioning as a photomemory device. It is a still further purpose to provide such a device which is capable of reproducing an incident image in the form of a multiplicity of small luminescent dots which are stabilized against spreading. Another purpose is to provide a method of producing such devices.

Figure 2:
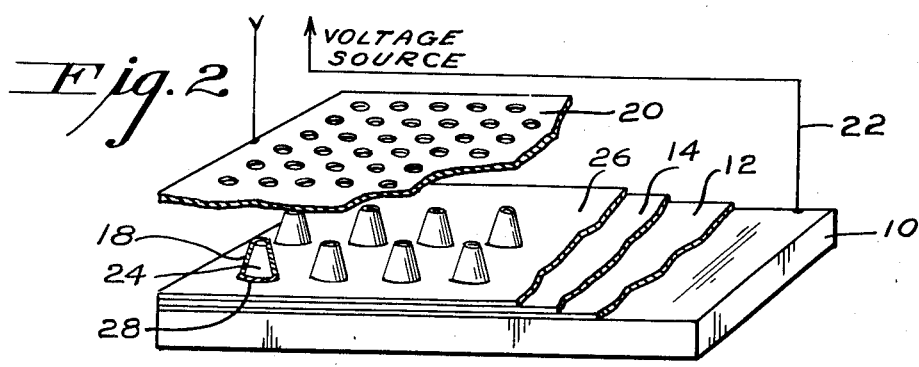

The present invention, and a manner in which it may be practiced to accomplish these and other purposes, are illustratively described in conjunction with the accompanying drawing in which, FIGS. 1 and 2 are perspective views, partially broken away, of devices in accordance with the invention.

FIGS. 3–8 are a sequence of side elevational views illustrating a method of producing devices in accordance with the invention.

Briefly, the electroluminescent device of the invention comprises electrodes separated by a layer of electroluminescent material, a pattern of dielectric pillars, and variable resistance means. Preferably the pillars are composed of glass and the variable resistance means is photoconductive material coated on the pillar walls.

The illustrative device of FIG. 1 includes a transparent insulating base 10, e.g. a clear glass plate, with a transparent electrode 12 applied over its upper surface. Electrode 12 may be for example an electroconductive, metal oxide coating produced in accordance with the teaching of United States Patent No. 2,564,706 issued to J. M. Mochel. Superimposed on electrode 12 is a layer 14 of a conventional electroluminescent material. Layer 14 may be on the order of 0.003 inch thick and consist of a suitable phosphor, such as zinc sulfide, dispersed in or carried by a readily fusible or sinterable, dielectric bonding material such as a soft glass or plastic. Glass or ceramic type frits generally provide better dielectric stability, but must be so selected as to be compatible and non-reactive with the phosphor during sintering. Also the frit must sinter at a sufficiently low temperature to avoid damage to the phosphor. A suitable glass for the purpose is composed of about 3.9% CaO, 4.8% BaO, 27.2% ZnO, 21.8% $SiO_2$, 26.8% $B_2O_3$, 8.8% $Na_2O$, 0.7% PbO and 5.8% $R_2O_3$ where R relates generically to trivalent metals.

Arranged on frit layer 14 and bonded thereto are a plurality of minute, vertical, accurately positioned glass columns 16. Columns 16, in the nature of tiny, spaced posts or pillars may be arranged in any desired pattern, although shown in straight rows. The walls or surfaces of pillars 16 have a photoconductive coating 18, such as cadmium sulfide, which is briefly fired at a sintering temperature to set such coating in place. Across the tops of such pillars is secured a thin electrode 20, which is preferably at least semi-transparent and may be a thin, perforated sheet of copper. Electrical connections 22 are made across electrodes 12 and 20 whereby a voltage source may be applied to operate a device.

In the operation of such a device, an A.C. potential, e.g. on the order of 600–800 volts at 600 c.p.s., is applied across the electrodes. Photoconductive coating 18 acts as a resistance and divides the applied potential such that the portion across frit layer 14 is insufficient to produce electroluminescence. The incidence of light on such coating however so reduces the resistance that, under those pillars which are affected, the increased potential across layer 14 gives rise to dots or spots of electroluminescence. It is obvious then that any light pattern or image incident on the coated glass posts 16 may be reproduced as a corresponding electroluminescent pattern in layer 14 and that the number of images, corresponding to bits of information that can be produced and stored depends on the extent to which the posts can be miniaturized. A portion of the light produced by such electroluminescence travels back through the pillars and strikes the photoconductive coating 18 thus creating a light feedback which serves to continuously activate the photoconductive coating and maintain a low resistance. Thus image continuity is provided after removal of the initiating light source for so long as a potential is applied across electrodes 12 and 20.

FIG. 2 illustrates a modified form of the device of FIG. 1, which is more suitable for image retention. A transparent electrode 12 is deposited on a glass plate 10 as in FIG. 1, and layer 14 of electroluminescent phosphor and carrier applied. Thereafter, a multiplicity of small truncated glass cones 24 are accurately positioned and sealed in place over layer 14 with a low melting point glass, here shown as a thin layer 26 sprayed over layer 14 and fired to seal to cones 24.

The mere presence of an essentially uniform thickness layer of sealing glass 26 serves three essential purposes; namely, it serves to insure that the cones will be properly sealed in accurately oriented positions; secondly, there now exists an enhanced capacitive effect under each cone by reason of the glass layer between the cone ends and the electroluminescent phosphor. This will increase the overall dielectric strength of the device and at the same time materially raise the level of voltage breakdown between the photoconductive material and the electroluminiscent phosphor. Thirdly, if the sealing glass is darkened it serves as a light barrier in that it will inhibit light from the activated phosphor area beneath a given cone from leaking to adjacent or nearby cones.

It is possible to still further minimize any light leakage to adjacent cones and to also further improve the light transmission to the individual cone when using a dark colored sealing glass to mount the cones. This is done by applying pressure to the cones while the sealing glass is soft, to squeeze out or extrude a major portion of the sealing glass from under the cone. This creates a glass layer that varies in thickness from a much darker and thicker layer between adjacent cones to an extremely thin layer, under the cones, that is imperceptibly darker than clear glass. Thus, the combination of the different thicknesses of sealing glass restricts the light feedback only to the intended cone by reason of the thin portion while providing a greater and more efficient light barrier to leakage light by reason of the thicker portions. The embedding of a portion of the cones resulting from pressing them into the sealing glass, does not appreciably deteriorate the now enhanced voltage breakdown characteristics that have been introduced by the addition of sealing layer 26.

The glass may be darkened by any of many well-known means such as the addition of colorants or the reduction of a glass component such as lead oxide.

A thin perforated metal foil or screen electrode 20 is applied over cones 24 after their walls are coated with a photoconductive layer of cadmium sulfide 18 as in FIG. 1. Electrical connections 22 are made to a voltage source for establishing a field.

It is, of course, desirable that feedback light travel through the glass cone and strike the photoconductive layer at the phosphor-glass interface. This action is facilitated by using a cone construction rather than a cylindrical wall normal to layer 14.

It is also highly advantageous to apply an adherent, transparent metal-oxide electrically-conducting coating over the bases of the truncated cones in the nature of a conducting cap as shown at 28. Since the generation of electroluminescence is capacitive in nature, coating 28 under each glass cone base in effect creates a plate under each cone. Such coatings may correspond to that employed for electrode 12.

It will be appreciated that the drawings are somewhat exaggerated for purposes of clearly illustrating the invention. By way of example the pillars or cones may have a maximum diameter on the order of 0.035–0.040 inch, a height of about 0.040 inch and a lateral spacing of 1/16–1/8 inch. In the interest of miniaturization smaller dimensions may be employed. Furthermore, while round pillars or cones have been shown, it will be understood that the invention is not restricted to such geometry and, for example, flat-sided configurations may be employed as well.

The production and accurate mounting of such small glass bodies presents somewhat of a problem. A practical method of accomplishing this end involves forming a pattern of pillars extending from a sheet of dielectric material such as glass. This may be done by sawing or otherwise mechanically forming a network of crossed grooves or channels extending partially through the glass sheet from one surface and defining the desired pillar pattern. The sheet may then be mounted on the layer of electroluminescent material with the pillar ends adhered thereto and the network of channels extended through the glass sheet to complete its subdivision into individual mounted pillars.

I have found a much simpler, more flexible method which I prefer to use and which is based on the principles of chemical machining of glass, as described in United States Patent No. 2,628,160 issued to S. D. Stookey. Briefly the Stookey method involves transforming a photosensitive glass in selected areas by irradiation and subsequent heat treatment to permit selective etching of the glass.

Figure 3:
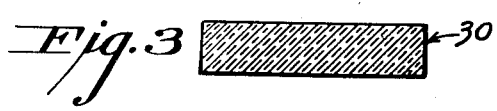
Figure 4:
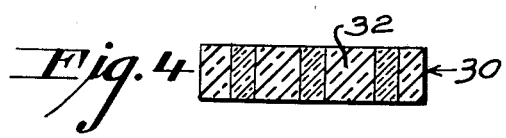
Figure 5:
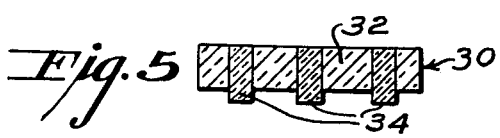
Figure 6:
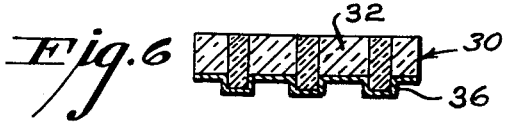

In producing and mounting the glass pillars in my device, then, a sheet of suitable photosensitive glass generally designated 30 as shown in FIG. 3, is exposed through a patterned negative and thermally treated to produce a web-like pattern 32 of exposed and selectively etchable glass in sheet 30, as shown in FIG. 4. The glass sheet is then given a shallow, or partial, etch on one surface, leaving a pattern of glass posts 34 protruding as shown in FIG. 5. If conducting caps corresponding to caps 28 in the device of FIG. 2 are desired, the etched side of plate 30 is provided with a conducting coating 36 of metal oxide such as tin oxide or a tin oxide-antimony oxide mixture as shown in FIG. 6. The excess coating under web 32 may be removed with the web glass as described subsequently.

Figure 7:
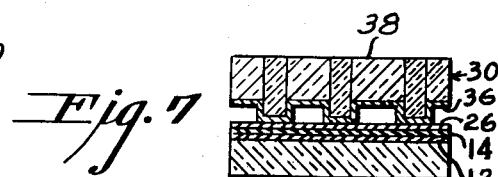

Glass sheet 30 is then positioned over a composite body composed of a base plate 10, a transparent electrode 12, an electroluminescent layer 14 and a layer of sealing glass 26 as shown in FIG. 7, and prepared as described earlier in connection with FIG. 2. With glass posts 34 resting on sealing glass coating 26, the assembly is heated to effect softening of the sealing glass and sealing of the assembly. If desired, pressure may be applied to thin out the sealing glass under the glass pillars.

Figure 8:
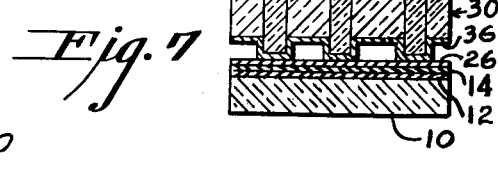

The opposite, and previously unetched, side 38 of glass plate 30 is then exposed to etching solution to complete etching of the web pattern from the sheet, as well as disruption and removal of those portions of coating 36 under the web. This leaves individual glass pillars 40, with caps 42, sealed in position as shown in FIG. 8. Photoconductive material may then be brushed or otherwise applied over the walls of the glass pillars and a perforated metal electrode attached to the pillar ends to produce a device corresponding to that of FIG. 2.

It will be appreciated that, by proper exposure of photosensitive glass sheets, cone-shaped pillars may also be produced in the same manner. A convenient means of accomplishing this is to hold the glass sheet at a suitable angle to the radiation source and rotate the sheet during its exposure through a patterned or perforated negative. Likewise, pillars of other cross-sectional geometry might be provided by use of a suitably patterned negative and exposure, as well as by conventional glass forming means such as sawing or cutting where flat sides are produced.

The device of the invention has been described in terms of an assembly wherein activating radiations incident on the radiation sensitive coating are generated in back of the device with respect to one observing the ultimate electroluminescent image and pass through the electrode corresponding to that designated by numeral 20 in the illustrations. While this is generally a preferred method of assembly and operation, it will be appreciated that the activating radiations, e.g. a point source of light, may be directed from the viewing side as well. In the latter case, transparency in the rear electrode 20 would not be a requisite.

What is claimed is:

1. A method of producing an electroluminescent device which comprises depositing a layer of electroluminescent material over an electrode, forming a pattern of pillars extending from a sheet of dielectric material, sealing the sheet to the electroluminescent layer by a layer of sealing glass which is of greater thickness intermediate the pillars than under the pillars with the exposed pillar ends adhered to said sealing glass layer completing subdivision of the dielectric sheet into individual pillars, applying a variable resistance material to the pillar walls, and attaching a second electrode over the pillars.

2. The method of claim 1 in which, after forming the pattern of pillars in the dielectric sheet, an electroconductive, metal oxide film is deposited over the exposed ends of the pillars to form electroconductive caps thereon.

3. In the production of an electroluminescent device having a pattern of spaced dielectric pillars adhered to a layer of electroluminescent material, the method of forming said pillars which comprises forming a pattern of pillars extending from a sheet of dielectric material, sealing the sheet to the layer of electroluminescent material by a layer of sealing glass with the pillar ends adhered to the sealing glass layer, and thereafter completing subdivision of the dielectric sheet into a plurality of individual pillars mounted on the electroluminescent layer.

4. The method of claim 3 in which the dielectric material is glass, and the pillars are initially formed and subdivision of the sheet subsequently completed by selectively etching the glass sheet.

5. In the production of an electroluminescent device having a pattern of spaced dielectric pillars adhered to a layer of electroluminescent material, the method of forming said pillars which comprises transforming a glass sheet to form therein a pattern of glass pillars separated by a continuous web of selectively etchable glass, partially etching away said web to leave portions of said pillars extending out from the remainder of said sheet, positioning the sheet over a layer of sealing glass material with the free ends of the pillars adhered thereto, and thereafter etching away the remainder of said glass web to leave a plurality of glass pillars mounted on said sealing glass layer.

6. The method of claim 5 in which the glass pillars are in the form of truncated cones and the glass is initially etched from the surface in which the base of said cones is formed.

7. A method of producing an electroluminescent device which comprises depositing a layer of electroluminescent material over an electrode, forming a pattern of pillars extending from a sheet of dielectric material, sealing the sheet to the electroluminescent layer by a layer of sealing glass with the exposed pillar ends adhered to said sealing glass layer, completing subdivision of the dielectric sheet into individual pillars, applying a variable resistance material to the pillar walls, and attaching a second electrode over the pillars.

No references cited.